United States Patent Office 3,654,284
Patented Apr. 4, 1972

3,654,284
13-SUBSTITUTED DIBENZO[b,g]QUINOLIZINES
John T. Suh, Mequon, and Richard A. Schnettler, Milwaukee, Wis., assignors to Colgate-Palmolive Company, New York, N.Y.
No Drawing. Filed Nov. 3, 1969, Ser. No. 873,647
Int. Cl. C07d 39/12
U.S. Cl. 260—289 R
8 Claims

ABSTRACT OF THE DISCLOSURE

The compounds are 13-substituted dibenzo[b,g]quinolizines which are useful as central nervous system depressants and agents to control aggressive antisocial behavior in animals. The compounds also may be used as intermediates in the preparation of pickling agents, mothproofing agents and wood preservatives. Representative of compounds disclosed are 2,3-dimethoxy-13-hydroxy-13 - phenyl - 5,7,12,13 - tetrahydro-12aH-dibenzo[b,g] quinolizine and 2,3 - dimethoxy-13-hydroxy-13-(3,4-dichlorophenyl) - 5,7,12,13 - tetrahydro-12aH-dibenzo[b,g] quinolizine.

DESCRIPTION OF THE INVENTION

The compounds of the present invention may be represented by the following formula:

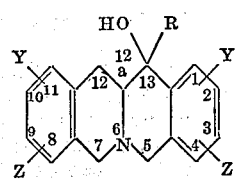

wherein Y and Z are the same or different members selected from hydrogen, hydroxy, a halogen such as bromo, chloro or fluoro, a lower alkoxy of 1 to 4 carbon atoms such as methoxy, ethoxy or propoxy, sulfamoyl, a lower alkyl sulfonamide such as methylsulfamoyl or trifluoromethyl and R is selected from hydrogen, an aryl group such as phenyl, a substituted phenyl, especially a halogen-substituted phenyl such as p-chlorophenyl, o-chlorophenyl, 3,4-dichlorophenyl, a lower-alkoxy substitued phenyl such as p-methoxyphenyl and 3,4-dimethoxyphenyl, a phenyl-lower alkyl containing 7 to 13 carbon atoms such as benzyl, phenethyl, phenylisopropyl or phenylbutyl and nuclear substituted phenyl lower alkyls, especially halogen and alkoxy-substituted members such as p-chlorobenzyl and o-methoxyphenyl-lower alkyls.

The starting materials for the preparation of the novel compounds of the present invention are the corresponding ketones of the following formula

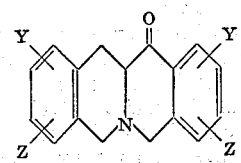

in which Y and Z are as previously defined.

The ketones may be conveniently prepared, for example, by reacting a correspondingly nuclear substituted ethyl 1,2,3,4-tetrahydroisoquinoline-3-carboxylate with a disubstituted benzyl chloride and potassium carbonate in anhydrous benzene under reflux conditions. The resulting ethyl N-disubstituted benzyl-1,2,3,4-tetrahydroisoquinoline - 3- carboxylate is then treated with a suitable base, such as sodium hydroxide, in water under reflux conditions to form the corresponding N-disubstituted benzyl-1,2,3,4-tetrahydroisoquinoline-3-carboxylic acid which upon treatment with polyphosphoric acid at elevated temperatures (approximately 100° C.) yields the desired ketone.

The process may be illustrated as follows:

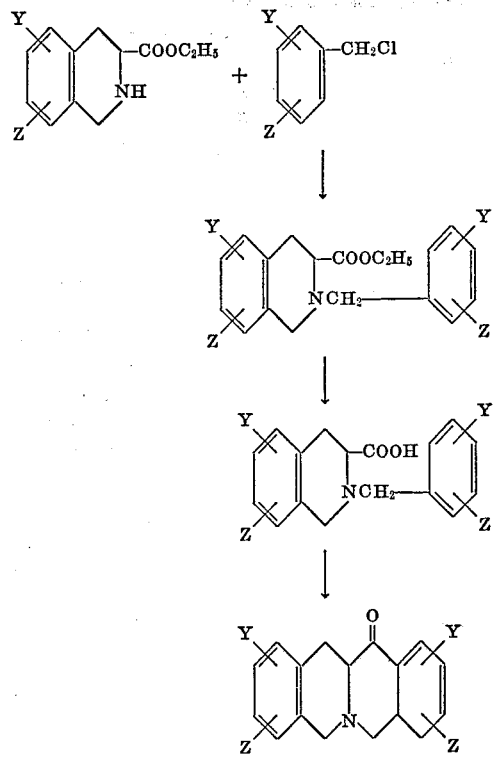

in which Y and Z are as previously defined.

In the preferred practice of the present invention the compounds of the formula

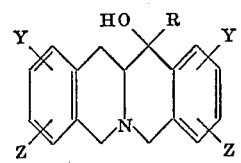

in which R is hydrogen are preferably prepared by reacting the desired ketone starting material in a lower alkanol, such as methanol, with sodium borohydride. If necessary, the resulting mixture is heated to reflux temperature. Upon cooling the desired 13-hydroxydibenzo[b,g]quinolizine precipitates.

The described process may be illustrated as follows:

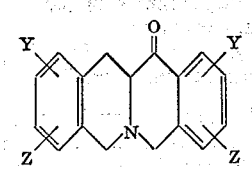

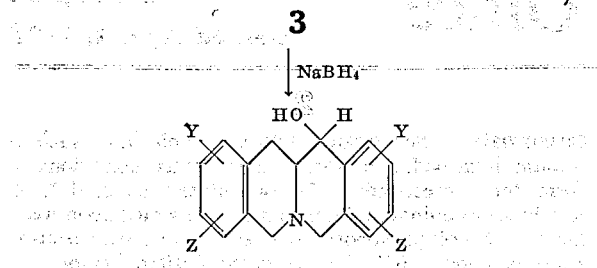

in which Y and Z are as defined.

Representative of the compounds which may be prepared by this process are 2,3-dimethoxy-13-hydroxy-5,7,12,13-tetrahydro-12aH-dibenzo[b,g]quinolizine,
3-methoxy-13-hydroxy-5,7,12,13-tetrahydro-12aH-dibenzo[b,g]quinolizine,
8,9-dichloro-13-hydroxy-5,7,12,13-tetrahydro-12aH-dibenzo[b,g]quinolizine,
2,3-dimethoxy-8,9-dichloro-13-hydroxy-5,7,12,13-tetrahydro-12aH-dibenzo[b,g]quinolizine,
2,3,8,9-tetramethoxy-13-hydroxy-5,7,12,13-tetrahydro-12aH-dibenzo[b,g]quinolizine,
2,3-dimethoxy-7-fluoro-13-hydroxy-5,7,12,13-tetrahydro-12aH-dibenzo[b,g]quinolizine, and
2,3-dimethoxy-10-chloro-13-hydroxy-5,7,12,13-tetrahydro-12aH-dibenzo[b,g]quinolizine.

The compounds in which R is other than hydrogen are preferably prepared by treating the desired nuclear substituted ketone with a Grignard reagent under conditions generally employed in reacting a Grignard reagent with a ketone to form a tertiary alcohol. The reactants are advisably combined in an anhydrous solvent such as ethyl ether, tetrahydrofuran or ethyl ether with benzene. The reaction mixture, if desired, can be heated at temperatures up to the reflux temperatures to promote the reaction. When the reaction is terminated water is added to hydrolyze the Grignard adduct to the desired tertiary alcohol. The resulting product can then be isolated from the mixture by conventional means such as evaporation of the solvent.

The described process may be illustrated as follows:

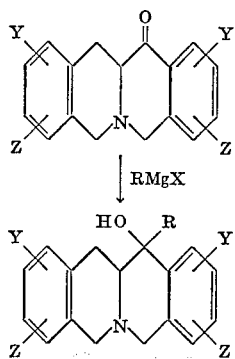

in which Y, Z and R are as previously described and X is a reactive halogen.

Among the Grignard reagents which may be employed are the following:

phenyl magnesium bromide,
phenyl magnesium iodide,
m-chlorobenzyl magnesium bromide,
benzyl magnesium bromide,
3,4-dichlorophenyl magnesium bromide, and
4-fluorophenyl magnesium bromide.

The Grignard reagents may be prepared by conventional methods such as those described in U.S. Patent 2,996,503 and German Patent 1,109,166.

Representative of the compounds which may be prepared by the practice of the present invention are 2,3-dimethoxy-13-hydroxy-13-phenyl-5,7,12,13-tetrahydro-12aH-dibenzo[b,g]quinolizine,
2,3-dimethoxy-13-hydroxy-13-(3,4-dichlorophenyl)-5,7,12,13-tetrahydro-12aH-dibenzo[b,g]quinolizine,
2,3-dimethoxy-13-hydroxy-13-(4-chlorophenyl)-5,7,12,13-tetrahydro-12aH-dibenzo[b,g]quinolizine,
2,3-dimethoxy-8,9-dichloro-13-hydroxy-13-(4-fluorophenyl)-5,7,12,13-tetrahydro-12aH-dibenzo[b,g]quinolizine, and
2,3-dimethoxy-8,9-difluoro-13-hydroxy-13-(3,4-dimethoxyphenyl)-5,7,12,13-tetrahydro-12aH-dibenzo[b,g]quinolizine.

The compounds of the present invention demonstrated in behavioral screening tests in mice a tranquilizer-like activity. The behavior of mice receiving 100 mg./kg. of the following compounds intraperitoneally was characterized by general symptoms of central nervous system depression such as decreased awareness and irritability:

2,3-dimethoxy-13-hydroxy-13-(3,4-dichlorophenyl)-5,7,12,13-tetrahydro-12aH-dibenzo[b,g]quinolizine,
2,3-dimethoxy-13-hydroxy-13-phenyl-5,7,12,13-tetrahydro-12aH-dibenzo[b,g]quinolizine, and
2,3-dimethoxy-13-hydroxy-5,7,12,13-tetrahydro-12aH-dibenzo[b,g]quinolizine.

As a result of the behavioral tests the above compounds were all found to have $LD_{50}$'s in excess of 175 mg./kg. The behavioral tests were conducted in accordance with the procedure set forth by Irwin in "Animal and Clinical Pharmacologic Techniques in Drug Evaluation," J. H. Nodine and P. E. Siegler, Ed., Year Book Publishers, Inc. (1966), pp. 36–54.

The compounds 2,3 - dimethoxy - 13 - hydroxy - 13- (3,4 - dichlorophenyl) - 5,7,12,13 - tetrahydro - 12aH-dibenzo[b,g]quinolizine and 2,3 - dimethoxy - 13 - hydroxy - 13 - phenyl - 5,7,12,13 - tetrahydro - 12aH-dibenzo[b,g]quinolizine were also found to be effective in controlling the aggressive antisocial behavior of mice which had been isolated for periods of two weeks. The $ED_{50}$ for each of the compounds was approximately 20 mg./kg. intraperitoneally.

When intended for pharmaceutical use the compounds and the acid addition salts of the compounds which are capable of forming such salts are preferrably combined with one or more suitable diluents and formed into unit dosage forms for oral or parenteral administration such as tablets, capsules or solutions. Unit dosage forms will generally contain from 10 to 100 mg. of the active ingredients. The daily dosage of the compound to be administered to a patient will be conditioned upon many factors such as age and weight of the patient, other medication, and, of course, the severity of his condition. However, generally speaking, the daily dose of the active ingredient will not exceed 55 mg./kg. of the patient's body weight.

The acid addition salts of the compounds of this invention may be produced by contacting the free base with a suitable organic or inorganic acid such as hydrochloric, sulfuric, phosphoric, maleic, fumaric and citric acid in a suitable mutual solvent.

The compounds of this invention form thiocyanic acid additions which when condensed with formaldehyde form resinous materials useful as pickling agents according to U.S. Patents 2,425,320 and 2,606,155. The compounds also form fluosilicic acid addition salts which are useful as wood preservatives and mothproofing agents according to U.S. Patents 1,915,334 and 2,075,359.

The following examples are presented to illustrate this invention:

Example 1.—Ethyl-N-(3,4-dimethoxybenzyl)-1,2,3,4-tetrahydroisoquinoline-3-carboxylate A mixture of 51.3 g. (0.25 mole) of ethyl 1,2,3,4-tetrahydroisoquinoline - 3 - carboxylate, 46.7 g. (0.25 mole) of 3,4-dimethoxybenzyl chloride and 20.0 g. of finely ground potassium carbonate in 150 ml. of dry benzene is refluxed for 22 hours, cooled and the solids filtered and washed with benzene. The benzene portions are extracted with 10% HCl solution, the aqueous portion washed with ether, made alkaline with solid potassium carbonate, extracted into ether, and dried (Na$_2$SO$_4$). Removal of the solvent leaves ethyl-N-(3,4-dimethoxybenzyl) - 1,2,3,4 - tetrahydroisoquinoline - 3 - carboxylate in the form of a light amber oil. Distillation of a portion affords an analytical sample of the compound as a pale yellow oil, B.P. 185–190° (0.1 mm.).

*Analysis.*—Calcd. for C$_{21}$H$_{25}$NO$_4$ (percent): C, 70.96; H, 7.09; N, 3.94. Found (percent): C, 70.72; H, 7.06; N, 3.60.

Example 2.—N-(3,4-dimethoxybenzyl)-1,2,3,4-tetrahydroisoquinoline-3-carboxylic acid 78.2 g. (0.22 mole) of ethyl-N-(3,4-dimethoxybenzyl)-1,2,3,4 - tetrahydroisoquinoline - 3 - carboxylate and 17.6 g. (0.44 mole) of sodium hydroxide in 275 ml. of 90% ethanol-10% water is refluxed for 4 hours. The solvent is evaporated and the residue dissolved in 1.0 liter of water. The pH is adjusted to 7 with 35% HCl solution and the solids filtered and dried. The white crystals of N - (3,4 - dimethoxybenzyl) - 1,2,3,4 - tetrahydroisoquinoline-3-carboxylic acid melt at 180–185°.

*Analysis.*—Calcd. for C$_{19}$H$_{21}$NO$_4$ (percent): N, 4.28. Found (percent): N, 4.15.

Example 3.—2,3-dimethoxy-5,7,12-trihydro-12aH-dibenzo[b,g]quinolizin-13-one

A mixture of 32.7 g. (0.1 mole) of N-(3,4-dimethoxybenzyl) - tetrahydroisoquinoline - 3 - carboxylic acid in 150 g. of polyphosphoric acid is heated at 90° for 4 hours, cooled, diluted to a volume of 1.5 liters with water. Solid potassium hydroxide is added until pH 8 is reached, the solids are filtered and dried to afford 2,3-dimethoxy - 5,7,12 - trihydro - 12aH - dibenzo[b,g]quinolizin-13-one as tan crystals, M.P. 168–170°.

*Analysis.*—Calcd. for C$_{19}$H$_{19}$NO$_3$ (percent): C, 73.77; H, 6.19; N, 4.53. Found (percent): C, 73.74; H, 6.45; N, 4.50.

Example 4.—2,3-dimethoxy-13-hydroxy-5,7,12,13-tetrahydro-12aH-dibenzo[b,g]quinolizine To a slurry of 3.1 g. (0.01 mole) of 2,3-dimethoxy-5,7,12 - trihydro - 12aH - dibenzo[b,g]quinolizin - 13-one in 50 ml. of methanol, 0.38 g. (0.01 mole) of sodium borohydride is added in portions. The solution is refluxed one hour, cooled, and the solids filtered and dried. The white crystals are recrystallized in ethanol to afford 2,3-dimethoxy - 13 - hydroxy - 5,7,12,13 - tetrahydro - 12aH-dibenzo[b,g]quinolizine as white crystals melting at 199–201°.

*Analysis.*—Calcd. for C$_{19}$H$_{21}$NO$_3$ (percent): C, 73.28; H, 6.80. Found (percent): C, 73.10; H, 7.02.

Example 5.—2,3-dimethoxy-13-hydroxy-13-phenyl-5,7,12,13-tetrahydro-12aH-dibenzo[b,g]quinolizine In 15 ml. of ether 2.4 g. (0.1 mole) of magnesium is suspended and 15.7 g. (0.1 mole) of bromobenzene slowly added. To the prepared Grignard reagent 3.1 g. (0.01 mole) of 2,3-dimethoxy-5,7,12-trihydro-12aH-dibenzo[b,g]quinolizin-13-one is added along with 50 ml. of THF and the solution refluxed 4 hours. After cooling and the addition of 300 ml. of saturated NH$_4$Cl solution, the product is extracted into chloroform, dried and the solvent removed under vacuum. The resulting oil is treated with 100 ml. of 1% HCl solution and 200 ml. of ether. The solid is filtered and recrystallized in ethanol-ether to afford 2,3-dimethoxy-13-hydroxy-13-phenyl-5,7,12,13-tetrahydro-12aH-dibenzo[b,g]quinolizine as the hydrochloride, M.P. 218–220°.

*Analysis.*—Calcd. for C$_{15}$H$_{15}$NO$_3$ (percent): C, 77.49; H, 6.50; N, 3.61. Found (percent): C, 77.18; H, 6.61; N, 3.56.

Example 6.—2,3-dimethoxy-13-hydroxy-13-(3,4-dichlorophenyl) - 5,7,12,13 - tetrahydro - 12aH - dibenzo[b,g]quinolizine The Grignard reagent is prepared in the usual way from 9.0 g. (0.04 mole) of 1,2-dichloro-4-bromobenzene and 0.97 g. (0.04 mole) of magnesium in 50 ml. of ether. After the magnesium is dissolved, 6.2 g. (0.02 mole) of 2,3 - dimethoxy - 5,7,12 - trihydro - 12aH - dibenzo[b,g]quinolizin-13-one and 100 ml. of THF are added and the mixture refluxed for 2 hours, poured in ammonium chloride solution, extracted into chloroform, washed with brine and dried (Na$_2$SO$_4$). Removal of the solvent leaves a dark oil which is chromatographed (400 g. silica gel, 50% CHCl$_3$:50% EtOAc). The crystalline solid thus obtained is recrystallized from ethanol to afford 2,3-dimethoxy-13-hydroxy-13-(3,4-dichlorophenyl) - 5,7,12,13 - tetrahydro-12aH-dibenzo[b,g]quinolizine as a pale yellow powder, M.P. 178.5–180°. The compound is a single isomer according to TLC.

*Analysis.*—Calcd. for C$_{25}$H$_{23}$NO$_3$Cl$_2$ (percent): C, 65.78; H, 5.08; N, 3.07. Found (percent): C, 65.03; H, 5.24; N, 3.29.

Example 7.—2,3 - dimethoxy - 13 - hydroxy-13-(4-chlorophenyl) - 5,7,12,13 - tetrahydro - 12aH - dibenzo[b,g]quinolizine A Grignard reagent is prepared from 6.1 g. (0.032 mole) of 1-chloro-4-bromobenzene and 0.87 g. (0.032 mole) of magnesium in 50 ml. of ether. After addition of 5.0 g. (0.016 mole) of 2,3-dimethoxy-5,7,12-trihydro-12aH-dibenzo[b,g]quinolizin-13-one and 100 ml. of THF to the Grignard reagent the mixture is refluxed two hours, poured into 200 ml. of ammonium chloride solution, extracted into chloroform, washed with brine and dried (Na$_2$SO$_4$). Removal of the solvent leaves a dark oil which is chromatographed (400 g. silica gel, 90% chloroform: 10% EtOAc) and recrystallized from ethanol to afford 2,3-dimethoxy - 13 - hydroxy - 13 - (4-chlorophenyl)-5,7,12,13-tetrahydro - 12aH - dibenzo[b,g]quinolizine as white crystals, M.P. 167–169°. TLC shows only one isomer.

*Analysis.*—Calcd. for C$_{15}$H$_{14}$NO$_3$Cl (percent): C, 71.17; H, 5.87; N, 3.32. Found (percent): C, 70.87; H, 5.76; N, 3.16.

We claim:
1. A compound of the formula

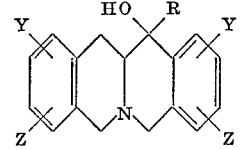

wherein Y and Z are hydrogen, hydroxy, halogen, lower alkoxy of 1 to 4 carbon atoms or trifluoromethyl and R is selected from hydrogen, phenyl, halogen-substituted phenyl, lower-alkoxy substituted phenyl, phenyl-lower alkyl, halogen-substituted phenyl-lower alkyl and lower alkoxy-substituted phenyl-lower alkyl.

2. A compound of claim 1 in which Y and Z are hydrogen, methoxy or chloro.

3. The compound of claim 1 in which Y and Z are hydrogen and R is phenyl.

4. The compound of claim 1 in which Y and Z are hydrogen, 2-methoxy and 3-methoxy and R is 3,4-dichlorophenyl.

5. The compound of claim 1 in which Y and Z are hydrogen, 2-methoxy and 3-methoxy and R is chlorophenyl.

6. The compound of claim 1 in which Y, Z and R are hydrogen.

7. A compound of claim 1 in which Y and Z are selected from hydrogen, lower alkoxy, halogen and trifluoromethyl.

8. A compound of claim 1 in which R is selected from phenyl, halogen-substituted phenyl and lower alkoxy-substituted phenyl.

References Cited

UNITED STATES PATENTS 3,578,668   5/1971   Schnettler et al. _____ 260—288

OTHER REFERENCES

Wiegrebe et al.: Arch. Pharm., vol. 301, pp. 33–8 (1968).

DONALD G. DAUS, Primary Examiner

U.S. Cl. X.R.

260—283 SA, 283 SY, 287 R; 424—258